(12) United States Patent
Lin

(10) Patent No.: US 8,303,111 B2
(45) Date of Patent: Nov. 6, 2012

(54) EYEGLASSES

(75) Inventor: Shin-Feng Lin, Tainan (TW)

(73) Assignee: High Rainbow Ent. Co., Ltd., Tainan (TW)

( * ) Notice: Subject to any disclaimer, the term of this patent is extended or adjusted under 35 U.S.C. 154(b) by 342 days.

(21) Appl. No.: 12/775,797

(22) Filed: May 7, 2010

(65) Prior Publication Data

US 2011/0032472 A1 Feb. 10, 2011

(30) Foreign Application Priority Data

Aug. 10, 2009 (TW) ................................ 98214640 U

(51) Int. Cl.
*G02C 1/04* (2006.01)
(52) U.S. Cl. ............................... 351/86; 351/83; 351/106
(58) Field of Classification Search .................. 351/110, 351/47, 57, 153, 156, 86, 83, 103, 106; 16/228
See application file for complete search history.

(56) References Cited

U.S. PATENT DOCUMENTS

| 6,994,434 B2 * | 2/2006 | Blanchette et al. | ............ 351/110 |
| 7,585,070 B2 * | 9/2009 | Hou | ............................... 351/111 |
| 7,703,913 B2 * | 4/2010 | Huang | ........................... 351/110 |

* cited by examiner

*Primary Examiner* — Hung Dang
(74) *Attorney, Agent, or Firm* — Wang Law Firm, Inc.; Li K. Wang; Stephen Hsu

(57) ABSTRACT

The pair of eyeglasses includes at least a lens, at least a frame, at least a pair of catching elements and at least a pair of temples. The lens is provided with at least a pair of extension portions respectively disposed in the left and right opposite ends, and each extension portion is provided with at least a pair of fixing pillars. The frame is provided with at least an upper groove in the upper elongated rim, at least a lower groove in the nose portion and at least a pair of inlaid blocks respectively disposed on the left and right opposite ends. One end of each catching element is coupled to each extension portion of the lens for each pair of fixing pillars in each extension portion to be caught in, and an opposite end is connected with one end of each temple, so as for the assembly of the lens, frame and temples to be completed in a simpler and fast way.

13 Claims, 9 Drawing Sheets

US 8,303,111 B2

EYEGLASSES

BACKGROUND OF THE INVENTION

1. Field of the Invention

The present invention is related to a pair of eyeglasses, with innovatory convenience and security features, and more particularly to a pair of eyeglasses in which grooves, inlaid blocks of the frame and catching elements are used for completing the pivotal connection between lens, frame and temples.

2. Description of the Related Art

There are more and more people who have poor eyesight and must wear eyeglasses to obtain better eyesight. Besides, most people like to do outdoor activities, and they must wear sunglasses to prevent strong sunrays from hurting their eyes. Many people whose eyes may be hurt by strong rays while working must wear industrial safety glasses to protect their eyes. Therefore, various kinds of glasses are indispensable for modern people in daily life. The most common style of eyeglasses in the current market is a pair of eyeglasses with an eyeglass frame to support a pair of lenses (framed eyeglasses) or with only a pair of lenses (frameless eyeglasses), wherein the temples are pivotally connected to the left and right opposite sides of the frame (lenses) with screws. However, when eyeglasses pivotally connected in such way are used for a long time, the screws may become loose or worn and thus lead to loosening of the temples. At this moment a supplementary tool, a screw driver, is needed to back the screws out or drive the screws in for further reparation or taking-apart. Not only does such process of taking-apart take much time and efforts, but it is also easy for screws to be indirectly damaged and thus become unusable when being backed out or driven in. Besides, if there is no supplementary tool at hand, the replacement cannot be done at all, which causes much inconvenience.

Furthermore, when this type of eyeglasses is produced, it is often needed to complete the pivotal connection of eyeglass frame (lens) and temples by handwork. In addition to the cost of raw materials, there will be extra cost of manpower for performing this handwork, and thus the production cost cannot be decreased, and the competitiveness in the industry will be lost.

BRIEF SUMMARY OF THE INVENTION

Therefore, in order to solve the above-mentioned problems, the present invention is to provide a pair of eyeglasses that substantially obviates the drawbacks of the related conventional art.

A primary objective of the present invention is to provide a pair of eyeglasses, in which fixing pillars (each preferably in the shape of a semicylinder) of the extension portions and receiving chamfers (each preferably in the shape of a three-fourths circle) of catching elements are used for completing the pivotal connection of lens and temples and which reduces complexity in assembling.

Another primary objective of the present invention is to provide a pair of eyeglasses, each of whose catching elements is provided with a pair of receiving chamfers (each in the shape of a three-fourths circle) so as to allow a pair of fixing pillars (each preferably in the shape of a semicylinder) of the extension portions to be firmly caught in and to provide better effect of pivotal connection between frame and lens and prevent separation from each other.

Still another primary objective of the present invention is to provide a pair of eyeglasses, whose frame is provided with an upper groove in the upper elongated rim and a lower groove in the nose portion for the one-piece lens to be inlaid in, and one end of each of whose pair of catching elements may be connected to one end of each of the temples or a fastening head strap so as to provide better replaceability.

Yet another primary objective of the present invention is to provide a pair of eyeglasses, which is assembled with a simpler method for saving time and manpower cost spent in completing pivotal connection and disassembly.

According to above objectives, the present invention provides a pair of eyeglasses in which grooves and inlaid blocks of the frame and catching elements are used for completing the pivotal connection between lens, frame and temples. The pair of eyeglasses includes at least a lens, at least a frame, at least a pair of catching elements and at least a pair of temples. The lens is provided with at least a pair of extension portions respectively disposed in the left and right opposite ends, and each extension portion is provided with at least a pair of fixing pillars. The frame is provided with at least an upper groove in the upper elongated rim, at least a lower groove in the nose portion and at least a pair of inlaid blocks respectively disposed on the left and right opposite ends. One end of each catching element is coupled to each extension portion of the lens for each pair of fixing pillars in each extension portion to be caught in, and an opposite end is connected with one end of each temple, so as for the assembly of the lens, frame and temples to be completed in a simpler and fast way.

Since the assembly method of the pair of eyeglasses in the present invention is simpler, the time and manpower cost spent in completing assembly and disassembly can be greatly reduced.

BRIEF DESCRIPTION OF THE DRAWINGS

The invention as well as a preferred mode of use, further features and advantages thereof will best be understood by reference to the following detailed description of the illustrative embodiments when read in conjunction with the accompanying drawings, wherein.

DETAILED DESCRIPTION OF THE PREFERRED EMBODIMENTS

The present invention discloses a pair of eyeglasses, and some detailed parts of process for manufacturing or processing eyeglasses are accomplished by applying prior art. Therefore, these parts will not be completely depicted in the description below. The drawings referred in the following are not made according to the actual related sizes, and the function of these drawings is only for illustrating characteristics related to the present invention.

Figure 1:
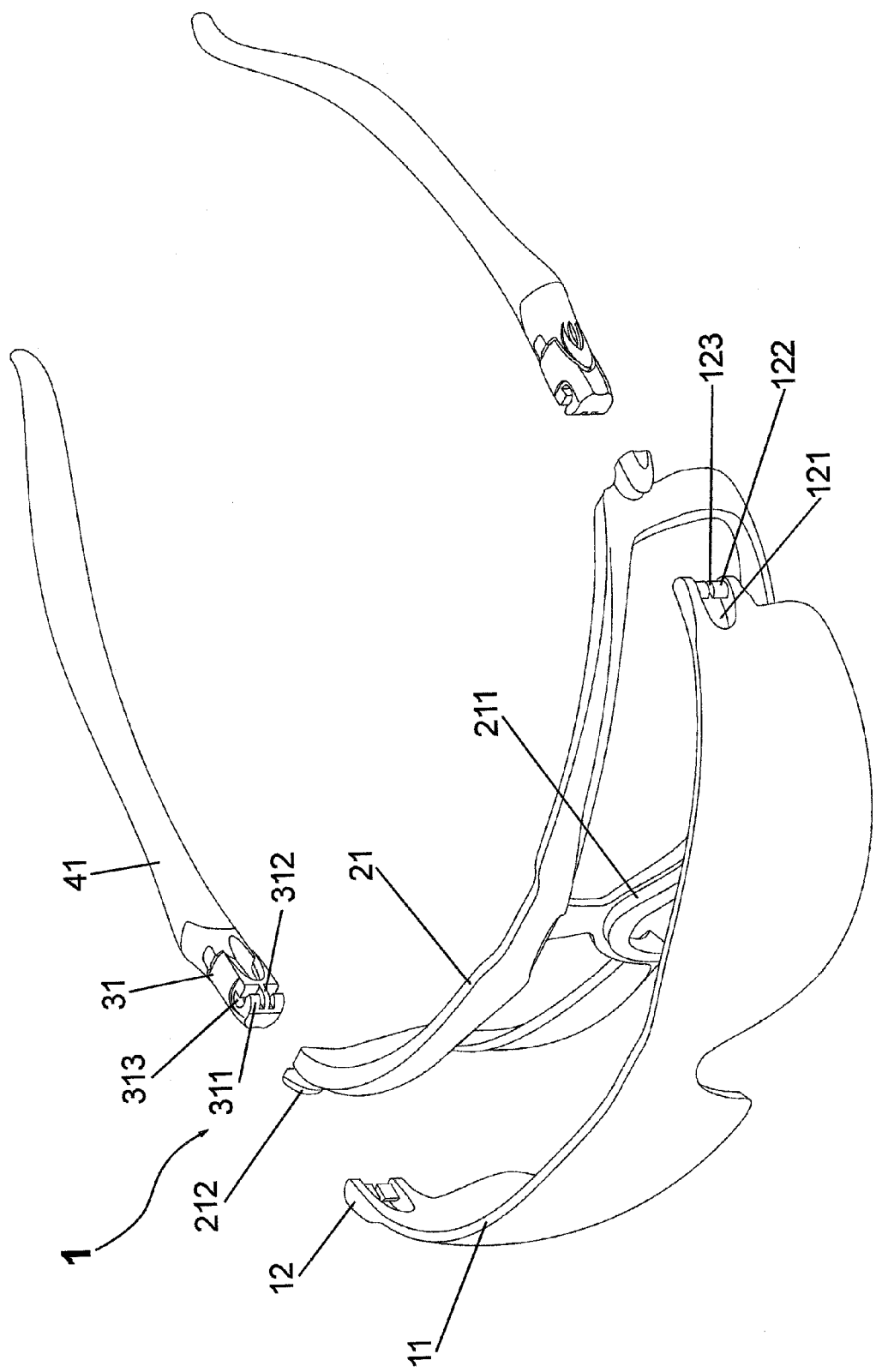
FIG. 1 is a perspective exploded view of a preferred embodiment of the eyeglasses in accordance with the present invention.
Figure 5:
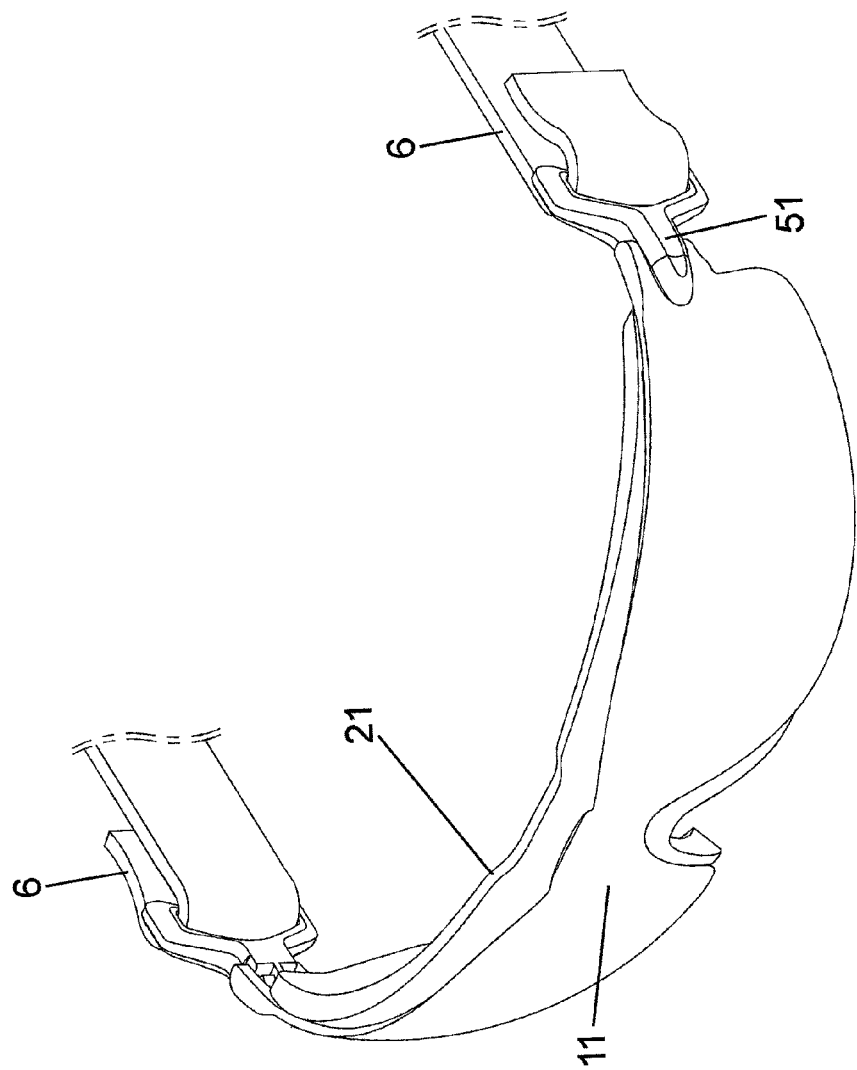
FIG. 5 is a perspective view of another preferred embodiment of the lens and frame being connected with a fastening head strap in accordance with the present invention.

FIG. 1 is a perspective exploded view of a preferred embodiment of the pair of eyeglasses according to the present invention. The pair of eyeglasses 1 is assembled by at least a lens 11, at least a frame 21, at least a pair of catching elements 31 and at least a pair of temples 41. The lens 11 is made to be one-piece and provided with at least a pair of extension portions 12 respectively disposed in the left and right opposite ends, at least a hollow 121 is formed in each extension portion 12, and at least a pair of fixing pillars 122 are provided to respectively protrude upward and downward and correspond to each other in each hollow 121. Each fixing pillar 122 is preferably in the shape of a semicylinder, and a gap 123 is formed between each pair of fixing pillars 122. The frame 21 is integral and provided with at least an upper groove in the upper elongated rim, at least a lower groove 211 in the nose portion and at least a pair of inlaid blocks 212 respectively disposed on the left and right opposite ends. Each of the pair of catching elements 31 is integral and provided with at least a pair of receiving chamfers 313 in one end, each receiving chamfer 313 is preferably in the shape of a three-fourths circle and provided with an entrance for receiving each of a pair of fixing pillars 122, at least a hook member 311 is formed at the entrance of each receiving chamfer 313, and at least a partition plate 312 is disposed between each pair of hook members 311. An opposite end of each catching element 31 can be fixedly coupled on one end of each of the temples 41, or alternatively fixedly coupled on one end of a fastening head strap 6, as shown in FIG. 5.

Figure 2:
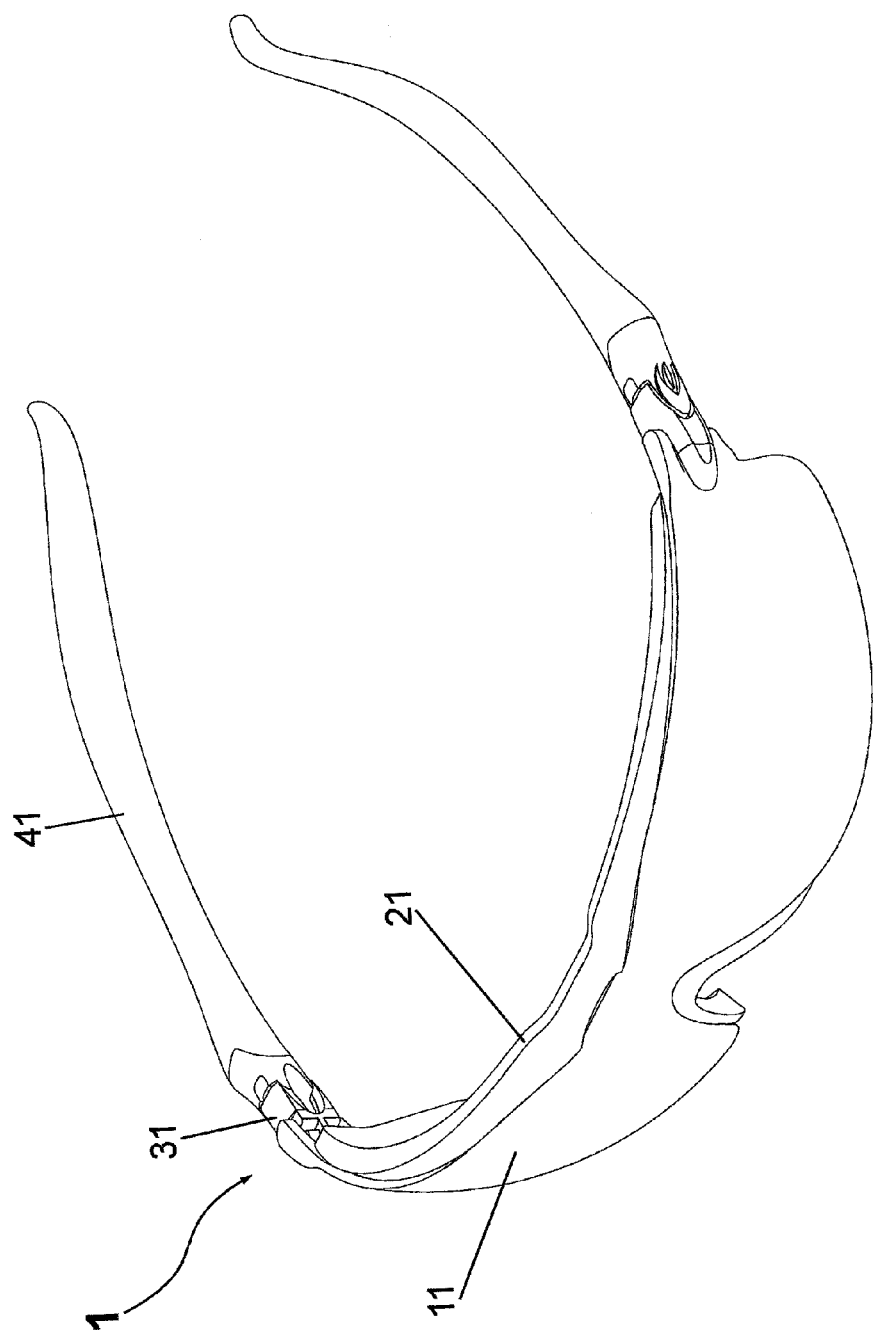
FIG. 2 is a perspective view of a preferred embodiment of the eyeglasses in an assembled configuration in accordance with the present invention.
Figure 2A:
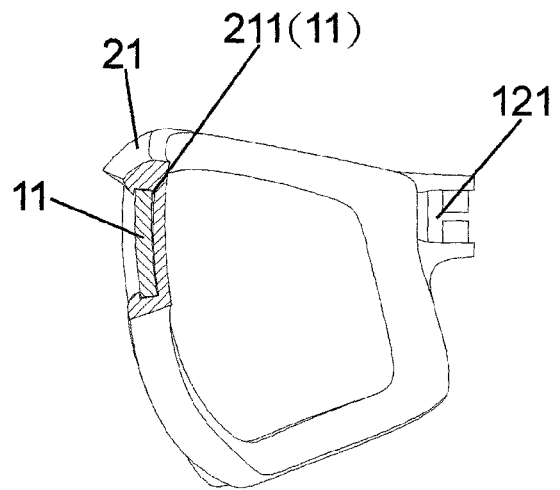
FIG. 2A is a partial cross sectional view of a preferred embodiment of the eyeglasses in an assembled configuration in accordance with the present invention.
Figure 2A:
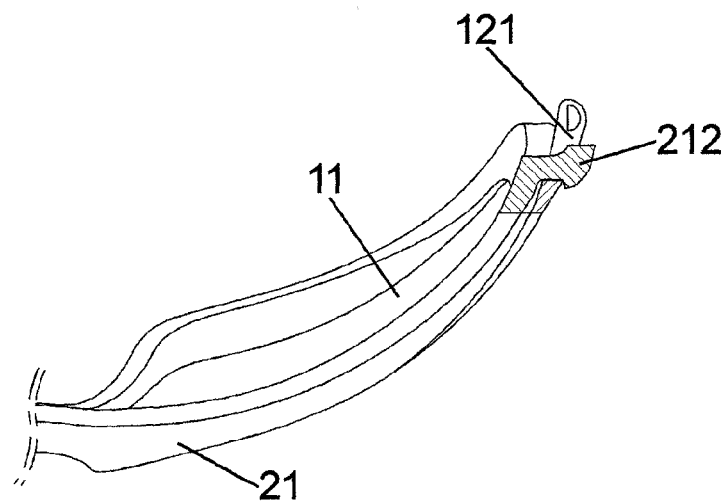
Figure 2B:
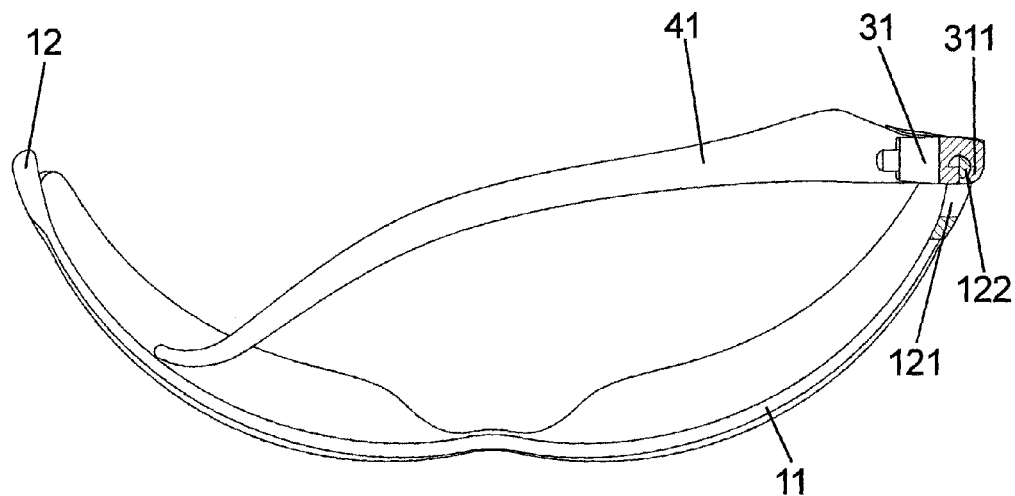
FIG. 2B is a cross sectional view of a preferred embodiment of the eyeglasses in an assembled configuration in accordance with the present invention.
Figure 2C:
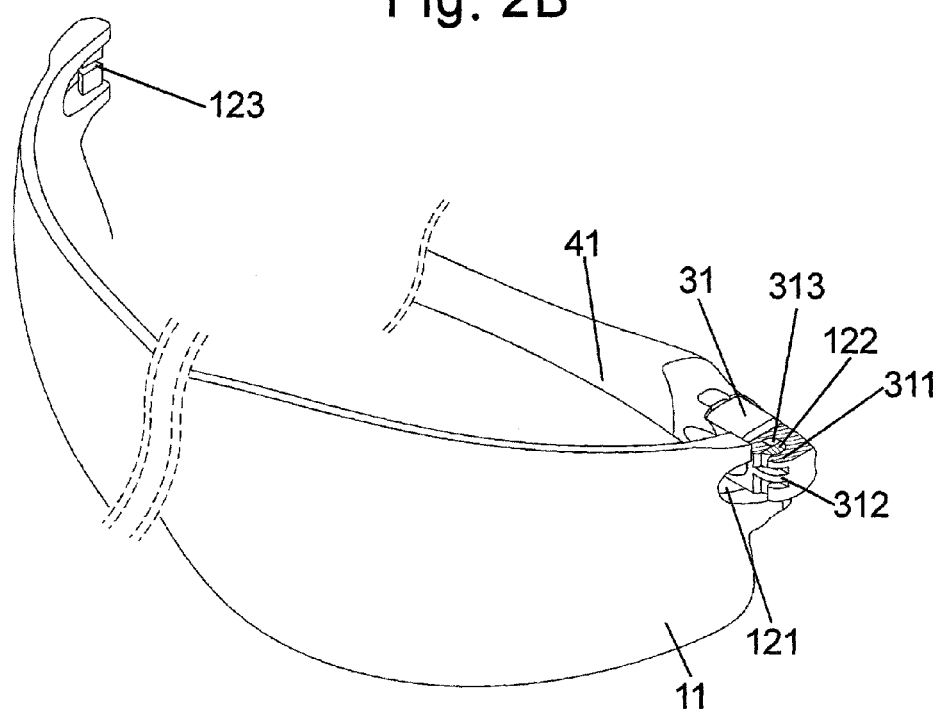
FIG. 2C is a perspective schematic view of a preferred embodiment of the eyeglasses in an assembled configuration in accordance with the present invention.
Figure 3:
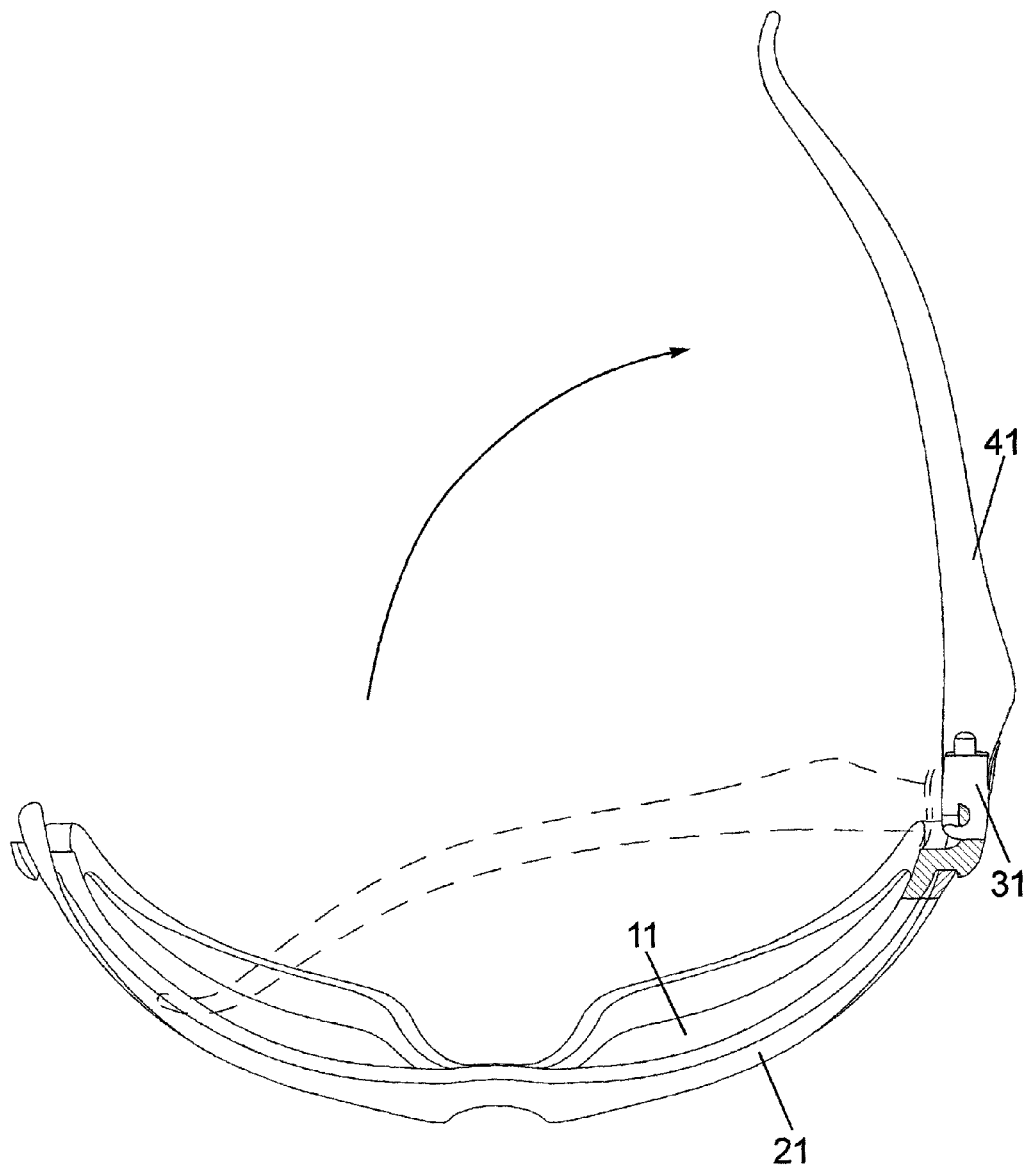
FIG. 3 is a schematic view of a preferred embodiment of the eyeglasses showing a temple being moved to a fixed position in accordance with the present invention.

While being assembled, referring to FIG. 2, the top elongated rim and the nose portion of the one-piece lens 11 are respectively inlaid into the upper groove in the upper elongated rim and the lower groove 211 in the nose portion of the frame 21, and then the pair of inlaid blocks 212 are respectively inlaid into the pair of hollows 121 of the lens 11 with a space remaining, as shown in FIG. 2A. Since an opposite end of each of the pair of catching elements 31 has been fixedly coupled to each end of the pair of temples 41, each pair of hook members 311 and each pair of receiving chamfers 313 in one end of each of catching elements 31 are coupled to each extension portion 12 of the lens 11 in an angle of 90 degrees, so as for each pair of fixing pillars 122 (each in the shape of a semicylinder) in each extension portion 12 to be inserted into each pair of entrances and accordingly received in each pair of receiving chamfers 313 (each in the shape of a three-fourths circle) in each of catching elements 31, as shown in FIG. 2B, each front end of each catching element 31 is inlaid in the remaining space of each hollow 121 of each extension portion 12, and each partition plate 312 of each of catching elements 31 is inserted in each gap 123 between each pair of fixing pillars 122, as shown in FIG. 2C. Then each catching element 31, which being coupled to one end of each temple 41, is moved outward to a fixed position, as shown in FIG. 3, so as to prevent from falling off and complete the pivotal connection between the lens 11 and the frame 21.

Figure 4:
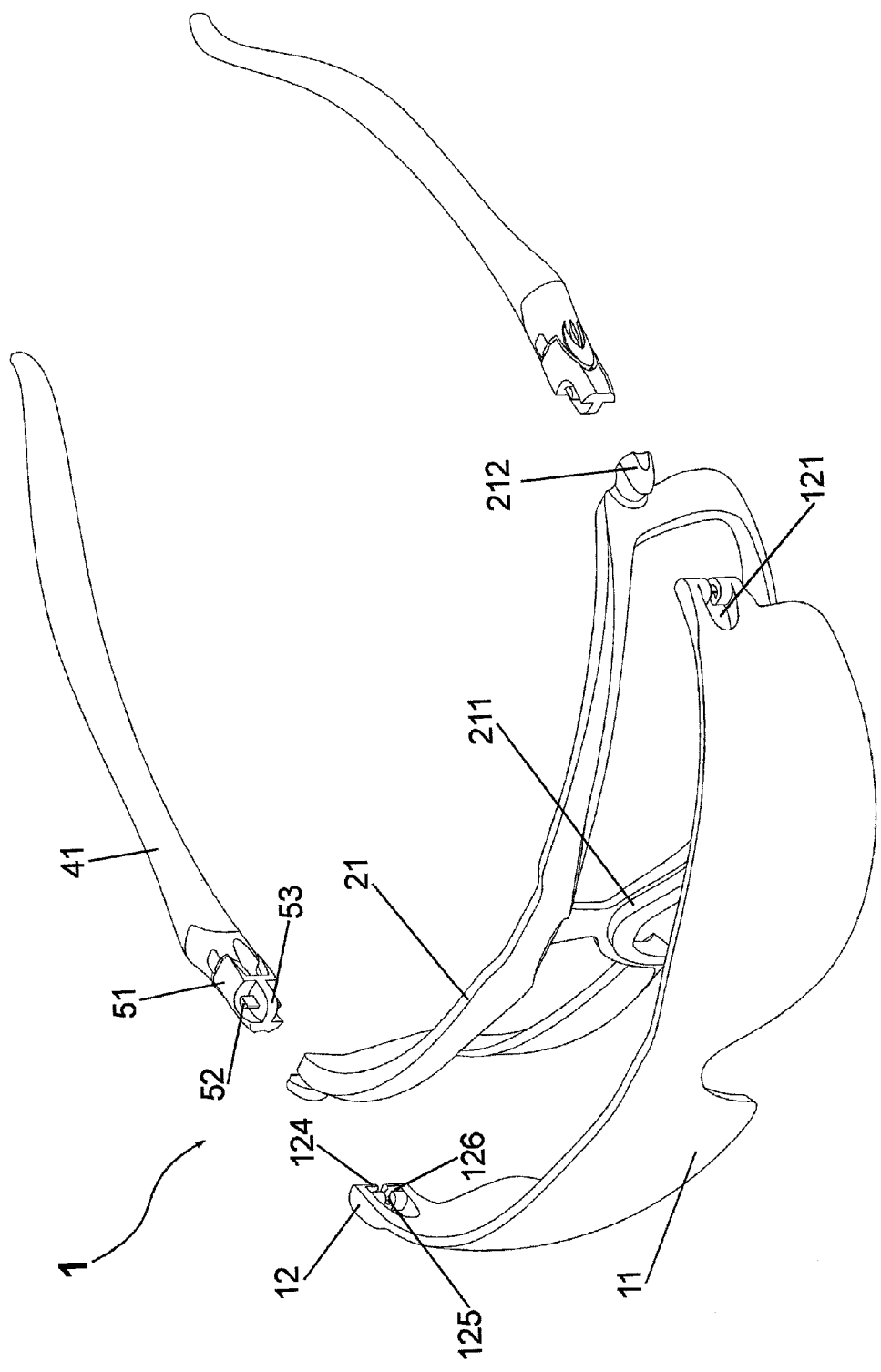
FIG. 4 is a perspective exploded view of another preferred embodiment of the eyeglasses in accordance with the present invention.

FIG. 4 is a perspective exploded view of another preferred embodiment of the eyeglasses according to the present invention. The pair of eyeglasses 1 is assembled by at least a lens 11, at least a frame 21, at least a pair of connecting elements 51 and at least a pair of temples 41. The lens 11 is made to be one-piece and provided with at least a pair of extension portions 12 respectively disposed in the left and right opposite ends, at least a hollow 121 is formed in each extension portion 12, at least a pair of receiving chamfers 126 are provided to respectively protrude downward and upward and correspond to each other in each hollow 121, each receiving chamfer 126 is preferably in the shape of a three-fourths circle and provided with an entrance for receiving each of a pair of fixing pillars 52, at least a hook member 124 is formed at the entrance of each receiving chamfer 126, and at least a gap 125 is formed between each pair of receiving chamfers 126. The frame 21 is integral and provided with at least an upper groove in the upper elongated rim, at least a lower groove 211 in the nose portion and at least a pair of inlaid blocks 212 respectively disposed on the left and right opposite ends. Each of the pair of connecting elements 51 is integral, at least a partition plate 53 is disposed in the middle of one end of each connecting element 51, at least a pair of fixing pillars 52 are disposed to respectively protrude upward and downward from the top and bottom surfaces of each partition plate 53 and correspond to each other, and each fixing pillar 52 is preferably in the shape of a semicylinder. An opposite end of each connecting element 51 can be fixedly coupled on one end of each of the temples 41, or alternatively fixedly coupled on one end of a fastening head strap 6, as shown in FIG. 5.

Figure 6:
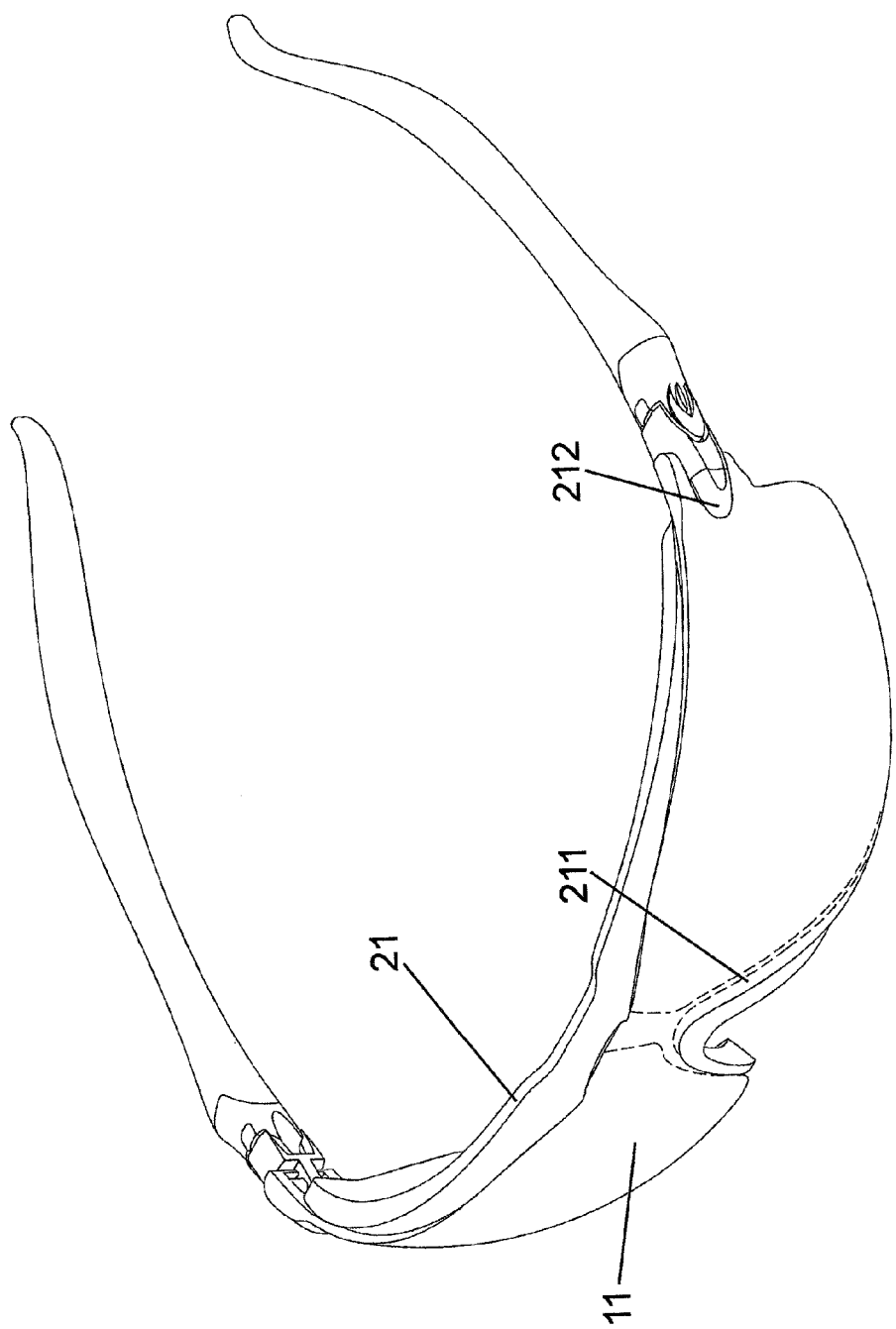
FIG. 6 is a perspective view of another preferred embodiment of the eyeglasses in an assembled configuration in accordance with the present invention.
Figure 6A:
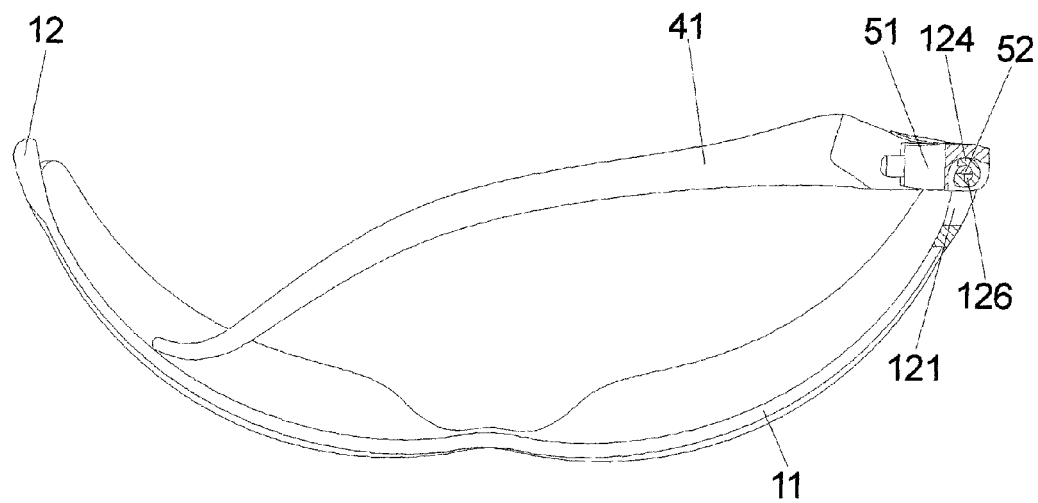
FIG. 6A is a cross sectional view of another preferred embodiment of the eyeglasses in an assembled configuration in accordance with the present invention; and, FIG. 6B is a perspective schematic view of another preferred embodiment of the eyeglasses in an assembled configuration in accordance with the present invention.
Figure 6B:
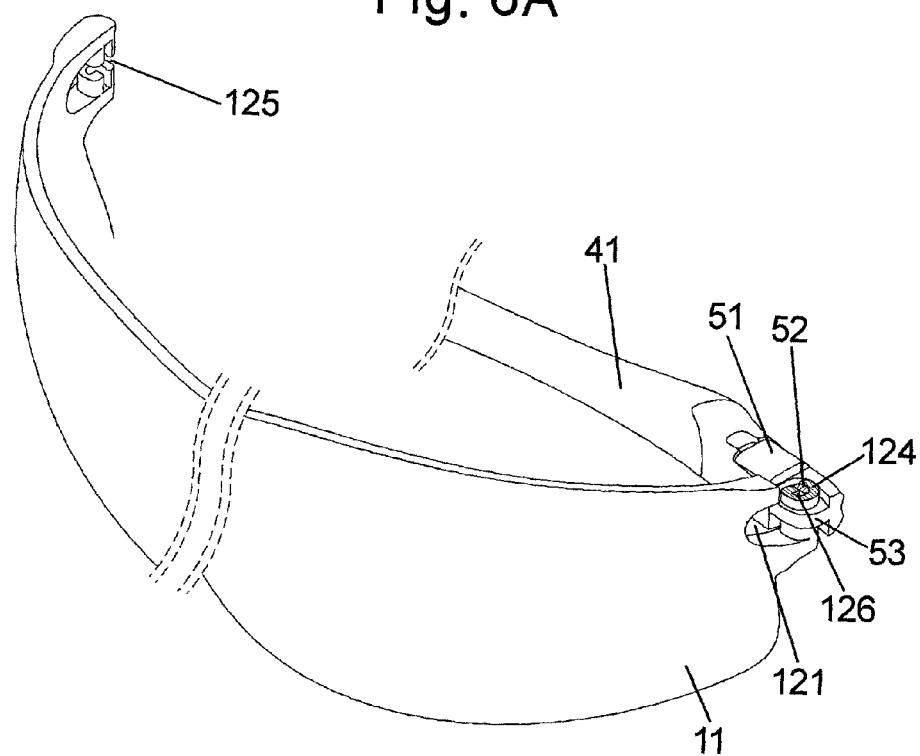

While being assembled, referring to FIG. 6, the top elongated rim and the nose portion of the one-piece lens 11 are respectively inlaid into the upper groove in the upper elongated rim and the lower groove 211 in the nose portion of the frame 21, and then the pair of inlaid blocks 212 are respectively inlaid into the pair of hollows 121 of the lens 11 with a space remaining for the front end of each connecting element 51 to be inserted in. Since an opposite end of each of the pair of connecting elements 51 has been fixedly coupled to each end of the pair of temples 41, the one end of each of the pair of connecting elements 51 is coupled to each extension portion 12 of the lens 11 at an angle of 90 degrees, so as for each pair of fixing pillars 52 in each connecting element 51 to be inserted into the entrances of each pair of receiving chamfers 126 and for each pair of fixing pillars 52 (each in the shape of a semicylinder) to accordingly be pivotally received in each pair of receiving chamfers 126 (each in the shape of a three-fourths circle), as shown in FIG. 6A, each front end of each connecting element 51 is inlaid in the remaining space of each hollow 121 of each extension portion 12, and each partition plate 53 of each connecting element 51 is inserted in each gap 125 between each pair of receiving chamfers 126, as shown in FIG. 6B. Then each connecting element 51, which being coupled to one end of each temple 41, is moved outward to a fixed position, so as to prevent from falling off and complete the pivotal connection between the lens 11 and the frame 21.

While the present invention has been described above by way of examples and in terms of the preferred embodiments, it is to be recognized and understood that the present invention is not limited to the disclosed embodiments, it is intended to cover various modifications and similar arrangements as may be made thereto, and the scope of the appended claims should be accorded the broadest interpretation so as to encompass all such modifications which may fall within the spirit and the invention.

What is claimed is:

1. A pair of eyeglasses, comprising:
at least a lens, said lens being provided with at least a pair of extension portions respectively disposed in the left and right opposite ends of said lens, at least a hollow being formed in each of said extension portions, and at least a pair of fixing pillars being provided in each said hollow, wherein each pair of said fixing pillars are provided to respectively protrude upward and downward and correspond to each other, a gap is formed between each pair of said fixing pillars; and,
at least a pair of catching elements, each of said catching elements being provided with at least a pair of receiving chamfers in one end of each of said catching elements, wherein each of said catching elements is provided with at least a hook member formed at the entrance of each said receiving chamfer, at least a partition plate is disposed between each pair of said hook members inserted in said gap between each pair of said fixing pillars, so as for each pair of said fixing pillars to be inserted into each said entrances and accordingly received in each pair of said receiving chamfer to prevent from falling off and complete the pivotal connection.

2. The pair of eyeglasses according to claim 1, wherein said pair of eyeglasses includes at least a frame, and said frame is provided with at least an upper groove in the upper elongated rim of said frame and at least a lower groove in the nose portion of said frame, said lens is inlaid into said upper groove in the upper elongated rim and said lower groove in the nose portion of said frame.

3. The pair of eyeglasses according to claim 2, wherein said frame is provided with at least a pair of inlaid blocks respectively disposed on the left and right opposite ends of said frame, said inlaid block is inlaid into said hollow of said lens.

4. The pair of eyeglasses according to claim 1, wherein each of said fixing pillars is preferably in the shape of a semicylinder.

5. The pair of eyeglasses according to claim 1, wherein each of said receiving chamfers is preferably in the shape of a three-fourths circle, and each pair of said receiving chamfers are provided for receiving each pair of said fixing pillars.

6. The pair of eyeglasses according to claim 1, wherein an opposite end of each of said catching elements can be fixedly coupled on one end of a fastening head strap.

7. A pair of eyeglasses, comprising:
at least a lens, said lens being provided with at least a pair of extension portions respectively disposed in the left and right opposite ends of said lens, at least a hollow being formed in each of said extension portions, and at least a pair of receiving chamfers being provided in each said hollow, wherein said pair of receiving chamfers in each of said hollows are provided to respectively protrude downward and upward and correspond to each other, each said receiving chamfer is provided with an entrance, and at least a hook member is formed at said entrance of each said receiving chamfer; and,
at least a pair of connecting elements, and at least a pair of fixing pillars being provided in one end of each of said connecting elements.

8. The pair of eyeglasses according to claim 7, wherein said pair of eyeglasses includes at least a frame, and said frame is provided with at least an upper groove in the upper elongated rim of said frame and at least a lower groove in the nose portion of said frame, said lens is inlaid into said upper groove in the upper elongated rim and said lower groove in the nose portion of said frame.

9. The pair of eyeglasses according to claim 8, wherein said frame is provided with at least a pair of inlaid blocks respectively disposed on the left and right opposite ends of said frame, said inlaid block is inlaid into said hollow of said lens.

10. The pair of eyeglasses according to claim 7, wherein at least a partition plate is disposed in one end of each of said connecting elements for said pair of fixing pillars to respectively protrude upward and downward from the top and bottom surfaces of each said partition plate and correspond to each other, and each of said fixing pillars is preferably in the shape of a semicylinder.

11. The pair of eyeglasses according to claim 7, wherein at least a gap is formed between each pair of said receiving chamfers.

12. The pair of eyeglasses according to claim 7, wherein each of said receiving chamfers is preferably in the shape of a three-fourths circle, and each pair of said receiving chamfers are provided for receiving each pair of said fixing pillars.

13. The pair of eyeglasses according to claim 7, wherein an opposite end of each of said connecting elements can be fixedly coupled on one end of a fastening head strap.

* * * * *